United States Patent Office 3,278,498
Patented Oct. 11, 1966

3,278,498
POLYOLEFIN TREATMENT WITH A SULFUR CONTAINING COMPOUND
Bernard Rudner and George S. Achorn, Pittsburgh, Pa., assignors to Koppers Company, Inc., a corporation of Delaware
No Drawing. Filed Nov. 13, 1961, Ser. No. 152,065
9 Claims. (Cl. 260—79.3)

This invention relates to a new method of preparing polymers derived from alpha-olefins and to the novel products prepared thereby. In one specific aspect, it relates to the addition of simple inorganic molecules to growing polymers. In another specific aspect, it relates to a simplified work-up procedure for preparing polymers of reduced ash-forming impurity content.

Polymerizations of ethylene and other alpha-olefins using coordination catalyst systems to produce industrially important products are well known. Such catalyst systems are mixtures consisting essentially of (1) organometallic compounds wherein the metal is selected from groups IA, IIA, or IIIA of the Periodic Table and (2) halides, alkoxides, or alkoxyhalides of a transition metal selected from Groups IVB, VB, VIB or VIIB of the Periodic Table. Typical examples of such systems are: (a) triethylaluminum combined with titanium tetrabromide and (b) diisobutylaluminum chloride combined with titanium trichloride. Although other known catalyst systems of this type, for instance, butyl lithium or phenylmagnesium chloride combined with vanadyl chloride or tetrabutyl-titanate, may yield polymers of slightly different properties, they involve the same general mechanism and are therefore considered equivalent for the purpose of this invention.

The first step of the mechanism, the initiation of polymer chains, is generally believed to involve conversion of the monomer, such as propylene, to a highly active species having at least one carbon to metal bond. The second step involves incorporating additional propylene molecules between the carbon and the metal atoms, so that chain propogation occurs outward from the metal atoms of the catalyst. If, during the process of chain growth, propylene monomer, dimer, trimer, etc. are all consumed without being replenished, chain growth will cease, but polymerization will not necessarily be terminated. As long as active catalyst remains, either in the form of the original components, or some useful products they might generate, initiation of new chains and growth in older ones will occur on supplying fresh monomer, without adding catalyst, under the original conditions, of polymerization. By the terms "living" polymer and "active" polymer, we include not only polymers in the state of chain growth, but also polymers whose growth is dormant because of lack of monomer, particularly those in which the capacity for growth has not been destroyed by chain termination.

Some of the polymer chains may be self-terminating by breaking away from the metal as terminal olefins of high or moderate molecular weight. However, a large number of chains, depending on the type of monomer and the conditions of polymerization, remain associated with metal atoms until polymerization is intentionally terminated in the polymer "work-up" and purification. Commonly, termination is effected by reacting the polymerization mixture with an excess of alcohol, such as methanol. The reaction may be set forth in the equation:

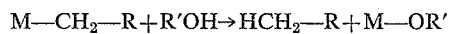

wherein M represents the metal, R is the growing polymer chain, and R' is a lower alkyl radical.

This procedure is not completely satisfactory as evidenced by the large number of improvement patents issued covering use of additives such as organic acids and chelating agents to improve the purity and, directly related, the properties of the polymers by more effectively removing the inorganic catalytic residues present. These residues, for example, aluminum and titanium halides, when not removed, reduce the thermal stability and resistivity of the polymer, and also cause inhomogeneity and discoloration.

Quite surprisingly, we have discovered that the reactions of certain simple inorganic compounds of sulfur with the growing polymers prepared from alpha-olefins in the presence of a coordination metal catalyst system lead to novel macromolecules of high purity. Polymers produced by our novel reaction show a considerable decrease in ash-forming impurities and inorganic catalytic residues.

Heretofore, terminating polymerization of alpha-olefins has been achieved by drowning the living polymer in a hydroxylic medium such as methanol. Unfortunately, this method does not permit very rapid termination because: (1) methanol does not "wet" the polymer readily and thus cannot immediately displace the solvent molecules surrounding the carbon-metal bonds; (2) methanolysis of a methanol-insoluble compound is a relatively slow reaction; (3) mixing polymerization suspension with an excess of methanol precipitates the polymer as agglomerates is which many of the carbon-metal bonds are inaccessible to methanol; and (4) methanol cannot convert many insoluble residues, e.g. those containing carbon to divalent or trivalent titanium bonds, to soluble or otherwise removable titanates.

However, the simple inorganic molecules used in our invention are largely hydrocarbon solvent-soluble, and instantly reactive with carbon-metal bonds without causing agglomeration.

Our novel termination reaction converts up to half of the polymer chains after hydrolysis into macromolecular mercaptans or acids. The single terminal functional groups permit a simplified determination of the polymer structure. Some of these terminal groups also give increased printability and increased thermal stability.

It is, therefore, an object of our invention to prepare new polymers containing reactive groups in the terminal position from alpha-olefins.

It is a further object to provide a new method for terminating polymerization of alpha-olefins by adding to the living polymers simple inorganic substances.

It is another object to make polymer containing reduced ash-forming impurities from alpha-olefins.

It is another object to provide improved control of polymerization by analysis of the chain terminating agents to measure the length of the polymer chain.

In accordance with the invention we have discovered a new method for terminating the coordination metal catalyzed polymerization of an alpha-olefin containing from two to nine carbon atoms by reacting the growing polymer with at least one compound selected from the group consisting of the oxides, oxyhalides, and halides of sulfur. We have further discovered that this termination reaction can be made to yield novel polymers in which a single functional group containing a sulfur atom is attached to the terminal carbon atom of up to 50% of the polymer chains.

Our invention is applicable to polymerization of single or mixed alpha-olefins containing from 2–9 carbon atoms. These include, but are not limited to: ethylene, allene, propylene, butadiene, isoprene, piperylene, cyclopentadiene, hexatriene, styrene, isopropenylbenzene and indene. Although functionally substituted olefins such as vinyl chloride, vinyl ethers and esters, acrylates and their derivatives may be polymerized by coordination catalysts, and the living polymers reacted with the simple inorganic compounds used in our invention, such reactions tend to modify, sometimes undesirably, the functional groups.

The simple inorganic compounds we have found useful as terminating agents are the oxides, oxyhalides and halides of sulfur.

The halides useful for our invention are chlorides, bromides and iodides. Chlorides are preferred as being more effective, more stable, and less expensive than the bromides or iodides.

The oxides, oxyhalides, and halides are equally effective in terminating polymerizations; however, they differ in other properties produced. Reactions of each group of simple inorganic compounds with the growing polymer is illustrated by the equations shown below.

Sulfur monochloride and sulfur dichloride yield, on hydrolysis, mercaptans. Sulfur dioxide and thionyl chloride both yield polymers containing anti-oxidant sulfinic acid groups and, in addition, the latter compound also gives polymers of reduced ash content. Use of sulfuryl chloride, in very limited quantities, yields polymers of high purity in which up to half of polymer chains are terminated by sulfonic acid groups. While this group does not have the anti-oxidant powers of the sulfinic acid groups, it does give the polymer a greater affinity for basic dyes and basic anti-oxidants. Some equations illustrating the terminating reactions of sulfur compounds are:

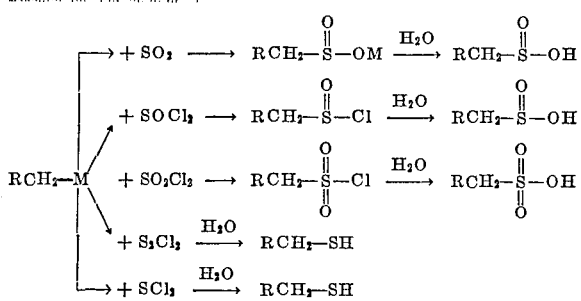

wherein M represents the metal and R is the growing polymer chain.

Desirable effects may also be obtained by reacting with the living polymer two or more of the simple inorganic compounds set forth in our invention in sequence or simultaneously.

The novel termination reactions are preferably carried out by adding, after a predetermined duration of polymerization, the simple terminator molecules to the active polymerization with vigorous agitation. It is necessary to use at least one equivalent of terminator for each equivalent of catalyst. Using more than one hundred equivalents of terminator per equivalent of catalyst is undesirably wasteful. As an example, polymerization of propylene in n-heptane by a mixture of one mmole of butyl lithium and one mmole of titanium tribromide, giving a total of 4 milliequivalents, could advantageously be terminated by no less than 2 mmoles of sulfuryl chloride.

The temperature at which the terminators may be added is not critical, and they may be added at the temperature of polymerization. Preferably, the reactions are best carried out at or above room temperature within a range of 20° C. to 150° C.

The termination reaction is preferably carried out at atmospheric pressure, but the range of about one to ten atmospheres is operable. No advantage is gained by working under reduced pressure.

When the termination reaction is completed, the reaction mass is mixed with approximately an equal volume of a hydroxylic solvent, such as a lower alkanol or water, which may contain small quantities of dispersants or other additives. Our novel process makes practical drowning in water alone, rather than expensive alcohols. For the first time, it also makes possible drowning in aqueous bases, avoiding the corrosion problems of the prior systems. Filtration then gives the desired novel polymer.

My invention is further illustrated by the following examples:

EXAMPLE I

A 2-liter dye resin pot was purged with nitrogen and charged under air-free conditions with 600 g. of pure, dry heptane, 0.009 mole of titanium tetrachloride and 0.0099 mole of diethylaluminum chloride (abbreviated DEAC), and the mixture stirred for one hour at 23° C. temperature to age the catalyst. Ethylene was fed into the mixture at 57°–61° C. for one hour giving 39 g. polymer/g. TiCl$_4$. Approximately half the polymer slurry was then transferred under nitrogen pressure into a second air-free flask and treated with 55 g. sulfur dioxide gradually added at 40°–50° C. Methanol was added to both the control and the treated polymer and each was separately filtered, restirring twice with 250 ml. of methanol plus 100 ml. of distilled water for ½ hour, and dried under vacuum at 60° C. overnight. The polymer obtained weighed 63 g., which when analyzed was purer than the control in carbon and hydrogen, contained 0.08% sulfur, 9 p.p.m. titanium, and had a molecular weight of 10,990 by cryoscopy in molten hexachlorobenzene. Calculations showed that the final polymer was made up of chains containing an average of 786 carbon atoms. The total number of chains terminated by

is 27.6%, since if each chain were terminated by

group, it would require 0.29% sulfur content compared to the 0.08% found, then one out of every three chains are terminated by this group.

EXAMPLE II

To 600 g. stirred dry heptane in an N$_2$-purged resin pot was charged 1.25 ml. DEAC, then 1 ml. TiCl$_4$, and the catalyst system aged at room temperature for one hour. Eethylene was fed in as before to a conversion rate of 34 g. polymer/g. catalyst. Only fourty-five minutes were required because the rate of polymerization was increased by reversing the order of addition of catalyst components. The polymerization temperature was kept below 66° C. by using a cooling bath. At the end of that time, approximately half of the well-stirred, active polymer suspension was blown by nitrogen to a purged dry flask and reacted anaerobically with 100 ml. of methanol. The other portion of the living polymer was treated with 29.5 g. dry sulfur dioxide at 57° C. for more than 2 hours, during which time the color faded from brown to cream. It was then treated, like the control, with methanol. Both products were filtered, washed, dried and characterized. The sulfur dioxide terminated polymer contained 0.12% sulfur, indicating that approximately 35% of the polyethylene chains are terminated by sulfinic acid groups. The viscosity average molecular weights of this novel product and the control were identical within experimental error (74,400 vs. 73,900) and both gave films of similar clarity. The polymeric sulfinic acid contained 85% less titanium than did the control, but approximately twice as much total ash. In spite of its higher inorganic content, the color and clarity of cast film was equal to that of control.

EXAMPLE III

The procedure of Example I was followed. Ethylene was passed into an aged suspension of 24.75 mmoles DEAC and 22.5 mmoles of TiCl$_4$ in n-heptane at 70–72° C. for a half hour. The polymer was divided into two parts, and the control drowned in methanol. The other portion was treated with sulfur dioxide for more than two hours. The total polymer weighed 196 g. A comparison between the control and the treated polymer showed:

|  | Control | SO₂-Treated |
|---|---|---|
| Melting Index | 0.54 g./10 min. | 0.38 g./10 min. |
| Brittle Failure at 110° C | 4 days | 18 days |
| Infrared Spectra | Typical polyethylene. | Polyethylene plus  —S—OR (absorption at 8.8 microns). |
| Molecular Weight (by viscosity) | 91,500 | 82,800. |

EXAMPLE IV

The procedure of Example I was repeated using 0.0019 mole SO₂Cl₂ after 26 g. polymer per gram TiCl₄. Film slightly yellower than control, containing 0.09% S, treatment caused 50% reduction in ash and 93.8% reduction in titanium content (from 129 p.p.m. for control to 8 p.p.m. for SO₂Cl₂ treated sample). IR spectra on treated polymer showed presence of $$\overset{O}{\underset{O}{-\overset{\|}{\underset{\|}{S}}-}}$$

groups.

EXAMPLE V

The procedure of Example I was repeated and polymer slurry divided into two parts: Half was treated with .019 m. undistilled S₂Cl₂ and the other half treated with 0.019 m. thionyl chloride, at a 13 g. polymer/g. TiCl₄ conversion. The latter proved more effective than former in removing inorganic constituents (the film from the first was much darker and dirtier than that from SOCl₂, which may be due to impurities in starting S₂Cl₂), gave a higher carbon and hydrogen value and lower ash, but much lower sulfur, suggesting S₂Cl₂ forms inorganic sulfides as well as organic disulfide.

EXAMPLE VI

Ethylene and styrene, mixed in approximately a 5:1 weight ratio, were copolymerized in n-heptane using a coordination catalyst system composed of ethylmagnesium bromide, titanium trichloride, and tetrabutyl titanate in a 1.5:1:0.5 molar ratio and a monomer to catalyst weight ratio of about 30:1. Approximately half of the living copolymer was drowned in 500 ml. well-stirred 1% hydrochloric acid containing 0.5 g. of a dispersant alkylnaphthalene sulfonate. The other half of the copolymer was stirred at 50° C. with 10 ml. thionyl chloride, then treated over 15 minutes with additional ethylene. Since there was no absorption of gas, and no sign of heat evolution, polymerization had obviously been terminated by the thionyl chloride and all active catalysts had been destroyed. This portion of polymer was drowned in the same way the control half was; both parts were washed and dried by the same procedure. The treated copolymer contained 0.06% sulfur as sulfinic acid groups, and 53% of the ash-forming inorganics that the control contained.

EXAMPLE VII

To demonstrate specificity of reaction, the polymer, as prepared in Example I, was treated with .019 m. of ClSO₃H at a 19 g. polymer/g. TiCl₄ conversion. Analysis gave no

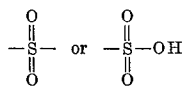

by IR and a small (less than 10%) reduction in titanium content. A film prepared from the polymer was much tanner and dirtier than control.

EXAMPLE VIII

Stability test

Compression molded sheets, 25 mils thick, were made of the experimental polymer of Example I and the control from Example I. Strips of each sheet were placed in an oven maintained at 105° C. Twice a day the strips were removed and cooled, bent flat upon themselves and allowed to return to position before being put back in the oven. The results are shown in the table below in which "Incipient Breakdown" is the time in hours at 105° C. for the first crack to appear during bending; "Failure" is the time when the break was complete.

|  | Incipient Breakdown | Failure |
|---|---|---|
| Sulfur dioxide treated polymer | 156 hours | 390 hours (stopped at 390 hours). |
| Control | 104 hours | 124 hours. |

EXAMPLE IX

Printability test

The experimental polymers of Examples III and IV and the control from Example I were compression molded into sheets 25 mils thick. Strips of each were marked with a commercially available black inker (Majic Marking, U. S. 2,713,176 and 2,416,596), and allowed to dry for five minutes. A strip of transparent adhesive ("Scotch Tape") was then placed over each inked surface, pressed down firmly and allowed to remain in place for five minutes. The adhesive was then removed from each with a single steady pull, and the amount of color on both adhesive and polyethylene compared. By visual inspection, the sulfurylchloride treated polymer retained ink better than did the sulfur dioxide treated one which, in turn, was better than the control. The order of improved printability and dyeability was S₂Cl₂, SO₂, and control.

We claim:

1. A process for terminating the polymerization of living alpha-olefin polymers prepared from alpha-olefins containing from two to nine carbon atoms initiated by a coordination metal catalyst system consisting essentially of organometallic compounds wherein the metal is selected from the group IA, IIA, IIIA of the Periodic Table and a member selected from the group consisting of the halides, alkoxides, and alkoxyhalides of a transition metal selected from group IVB, VB, VIB and VIIB of the Periodic Table, comprising reacting the carbon-metal bonds on the terminal ends of said living polymers with an inorganic compound selected from the group consisting of the oxides, oxychlorides, and chlorides of sulfur, wherein the amount of said compound is at least one equivalent for each equivalent of said catalyst used.

2. A process for making polymers of improved properties, comprising reacting the carbon-metal bonds on the terminal ends of the living polymers prepared from alpha-olefins containing from two to nine carbon atoms initiated by a coordination metal catalyst system consisting essentially of organometallic compounds wherein the metal is selected from the group IA, IIA, IIIA of the Periodic Table and a member selected from the group consisting of the halides, alkoxides, and alkoxyhalides of a transition metal selected from group IVB, VB, VIB and VIIB of the Periodic Table, with at least one inorganic compound selected from the group consisting of the oxides, oxychlorides, and chlorides of sulfur, then treating the product with a hydroxylic solvent selected from the group consisting of lower alkanols and water, and filtering the mixture to obtain the said polymer.

3. A process for making polymers of improved properties, comprising reacting the carbon-metal bonds on the terminal ends of the living polymers prepared from alpha-olefins containing from two to nine carbon atoms initiated by a coordination metal catalyst system consisting essentially of organometallic compounds wherein the metal is selected from the group IA, IIA, IIIA of the Periodic Table and a member selected from the group consisting of the halides, alkoxides, and alkoxyhalides of a transition metal selected from group IVB, VB, VIB, and VIIB of the Periodic Table with sulfur dioxide then treating the product with a hydroxylic solvent selected from the group consisting of lower alkanols and water, and filtering the mixture to obtain the said polymer.

4. A process according to claim 2, wherein the inorganic compound is thionyl chloride.

5. Polymers prepared by polymerizing a member selected from the group consisting of ethylene and propylene in the presence of a coordination metal catalyst system consisting essentially of organometallic compounds wherein the metal is selected from the group IA, IIA, IIIA of the Periodic Table and a member selected from the group consisting of the halides, alkoxides, and alkoxyhalides of a transition metal selected from group IVB, VB, VIB and VIIB of the Periodic Table, in which between 5 to 50% of the polymer chains contain no more than one per chain of a member selected from the group consisting of mercaptan, sulfinic acid, and sulfonic acid residues, said member being attached to a terminal carbon atom of the polymer chain.

6. Polymers according to claim 5, wherein mercaptan radicals are attached to a terminal carbon of the polymer chain.

7. Polymers prepared by polymerizing a member selected from the group consisting of ethylene and propylene in the presence of a coordination metal catalyst system consisting essentially of organometallic compounds wherein the metal is selected from the group IA, IIA, IIIA of the Periodic Table and a member selected from the group consisting of the halides, alkoxides, and alkoxyhalides of a transition metal selected from group IVB, VB, VIB, and VIIB of the Periodic Table, in which between 5 to 50 percent of the polymer chains contain no more than one per chain of sulfinic acid radicals are attached to a terminal carbon of the polymer chain.

8. Polymers according to claim 5, wherein sulfonic acid radicals are attached to a terminal carbon of the polymer chain.

9. A process for terminating the polymerization of living ethylene polymers initiated by a coordination metal catalyst system consisting essentially of diethylaluminum chloride and titanium tetrachloride, comprising reacting the carbon-metal bonds on the terminal ends of the living ethylene polymer with at least one equivalent of sulfur dioxide for each equivalent of catalyst used at a temperature of 40–50° C., treating the product with methanol and filtering to obtain the ethylene polymer.

References Cited by the Examiner

UNITED STATES PATENTS

| | | | |
|---|---|---|---|
| 2,615,043 | 10/1952 | Kharasch et al. | 260—543 |
| 3,012,023 | 12/1961 | Anderson et al. | 260—94.9 |
| 3,012,996 | 12/1961 | McFarland | 260—79.3 |
| 3,074,917 | 1/1963 | Reynolds | 260—85.1 |

OTHER REFERENCES

Coates: Organo Metallic Compounds, Metheun, London (1956), page 47.

Vesely: J. Polymer Sci., vol. 55, pages 25–32, 1961.

JOSEPH L. SCHOFER, *Primary Examiner.*

D. E. OLSON, F. L. DENSON, *Assistant Examiners.*